United States Patent [19]

Soffer et al.

[11] Patent Number: 5,575,963
[45] Date of Patent: Nov. 19, 1996

[54] SELECTIVE CLOGGING OF FAILED FIBERS

[75] Inventors: Abraham Soffer, Arad; Shlomo Saguee, Beer-Sheva; Dan Golub, Omer; Haim Cohen, Beer-Sheva; Moshe Azariah, Moshav Gilat, all of Israel

[73] Assignees: Rotem Industries, Ltd., Israel; AGA Aktiebolag, Sweden

[21] Appl. No.: 248,331

[22] Filed: May 24, 1994

[30] Foreign Application Priority Data

Jun. 1, 1993 [IL] Israel .......................................... 105875

[51] Int. Cl.$^6$ ..................................................... B32B 35/00
[52] U.S. Cl. ................................. 264/36; 156/94; 425/11; 427/140
[58] Field of Search ........................... 264/36; 427/140; 156/94; 425/11–13

[56] References Cited

U.S. PATENT DOCUMENTS

| | | |
|---|---|---|
| 3,499,062 | 3/1970 | Geary, Jr. et al. ........................ 264/36 |
| 4,170,695 | 10/1979 | Brown et al. . |
| 4,226,921 | 10/1980 | Tsang . |
| 4,230,463 | 10/1980 | Hemis et al. . |
| 4,248,648 | 2/1981 | Kopp . |
| 5,221,388 | 6/1993 | Haubs et al. ........................... 264/36 X |

FOREIGN PATENT DOCUMENTS

| | | |
|---|---|---|
| 2537882 | 6/1984 | France . |
| 3942659 | 9/1990 | Germany . |
| 54-135675 | 10/1979 | Japan . |
| 79-86769B | 12/1979 | Japan . |
| 61-101205 | 5/1986 | Japan . |
| 93/08987 | 5/1993 | WIPO . |

*Primary Examiner*—Karen Aftergut
*Attorney, Agent, or Firm*—Merchant, Gould, Smith, Edell, Welter & Schmidt

[57] ABSTRACT

A method of selective clogging of failed hollow fibers of a membrane module, including a pack or bundle of fibers in a shell-side and bore-side arrangement which includes failed fibers and non-failed fibers, comprises the steps of: clogging bores of all of the fiber at one end of the pack or bundle of the fibers; substantially evacuating the membrane module both at the shell-side and at the bore-side; filling the bore-side and the shell-side with a non-permeant gas; subsequently-holding the membrane module vertically, disconnecting the bore-side of the membrane module from a supply of the non-permeant gas and dipping another end of the membrane module opposite to the clogged end into a reservoir containing a liquid sealant; applying a reduced pressure to the shell-side for a period of time sufficient to permit suction of sealant into the bores of the failed fibers through a failure of which vacuum is applied to the bore-side; allowing the sealant to solidify at least partially to clog the bores of both the failed fibers and the non-failed fibers; and cutting off a length of the bundle of the fibers such that the bores of the non-failed fibers are exposed while the bores of the failed fibers remain clogged.

10 Claims, 5 Drawing Sheets

SELECTIVE CLOGGING OF FAILED FIBERS

FIELD OF THE INVENTION

The present invention relates to the field of hollow fiber membranes. More particularly, the invention relates to a method of repairing hollow fiber membrane modules by the selective clogging of fibers which have failed during the manufacturing process.

BACKGROUND OF THE INVENTION

Membrane processes are material separation processes based upon the passage of material through the membranes wall to allow the selective separation of different materials.

A membrane is a solid configured as a thin layer of large surface area. Among other purposes, membranes serve as tools of separating two or more material components out of a mixture. The separative properties of membranes are based upon their different permeabilities to the various material components. Thus, in order to effect a separation, a driving force must exist across the membrane, which promotes the permeation of material through it, which may be a pressure or a concentration differential.

For the case of pressure differential driving force, the membrane must acquire the mechanical strength necessary to withstand the pressure differential. This contradicts the requirement that the membrane must be as thin as possible in order to allow large cross-flows. Therefore, the membrane is supported on a relatively porous support which sustains the mechanical load on the one hand, and allows free cross-flow of material through its large pore system on the other hand.

The necessity to have thin membrane layers, large surface areas in a given volume of a membrane separator, and a porous mechanical support has brought about the development of the hollow fiber membranes. These are thin tubes of circular cross-section. As such, they are self-supporting and occupy a small volume per unit surface area. A hollow fiber membrane module for separation is most frequently designed as a shell-and-tube assembly, as shown in FIG. 1. In such an arrangement, separate accesses to the interior (bore) and exterior (shell) sides of the HF membrane are possible, so as to enable the separation of the three major material flows: the feed, the reject which is collected at the opposite side of the module but at the same membrane face at which the feed was introduced, and the permeate which is the result of the flow through the membrane.

A bundle of hollow fiber (HF) membranes, when assembled in a shell-and-tube configuration for separation purposes, may contain a few broken or pinholed fibers. This is schematically illustrated by numeral 1 in FIG. 2, where a broken fiber is shown. The material transfer through these defects is non-selective and very high in comparison to the rest of the membrane wall, which was designed to acquire a desired selectivity. Therefore, such defects destroy the separative properties of the membrane bundle, and, if they are frequent, practically render it ineffective. It is therefore clear that, in order to be able to exploit fiber bundles containing failed fibers, it is necessary to find a method by means of which these defects can be repaired or avoided, or their undesirable result excluded.

The obvious method to avoid such defects is to improve the various steps of the process of membrane production. However, spinning hollow membrane fibers at an industrial scale always suffer from some extent of defects. This is especially so in the case of asymmetric membranes which have a very thin and thus vulnerable active skin, whereas the occurrence of pinholes of various diameters is very likely. In fact, the limit to thinning the skin in hollow fibers is set by the formation of defects.

Other occurrences of pinhole formation in membranes result not in the course of membrane production, but in the course of subsequent handling and treatments. This is particularly abundant in membranes of great brittleness and fragility, as is the case with ceramic and carbon membranes, and certain stiff, glassy polymers. Under such circumstances, the hollow fibers produced by the spinning system may be free of defects, but further handling which asserts mechanical stress, such as spool winding and unwinding, cutting the fibers to the length, inserting the hollow fiber bundle into the tube and end potting may cause damage.

THE PRIOR ART

In order to overcome such problems, various methods of mending defects in hollow fiber membranes have been developed. In U.S. Pat. No. 4,230,463 (Henis et al.), a method of coating a hollow fiber aimed at gas separation, with a silicone rubber layer which could clog the defects but, being highly permeable to gases, did not impede the total gas flow through the membrane to a significant extent. The coating polymer was applied as a solution in a volatile solvent such as pentane, and vacuum was applied at the bore side. By this procedure the polymer solution was forced into the defects and insured their clogging.

Alternatively, the polymer coating solution is introduced through the bore side of the hollow fiber while the active skin is at the shell side. Thus, the solution dries out upon reaching the outer side of the membrane, and a polymer clog forms selectively at the pinhole outlets to the shell side, where solvent evaporation takes place.

The abovementioned prior art processes are useful for treating defects not larger than 1 micron (and probably less), but are unsuitable for dealing width broken fibers.

An alternative method of avoiding defective membranes is individual detection and removal. If performed manually, this would be prohibitively time-consuming at an industrial scale.

SUMMARY OF THE INVENTION

It is an object of the present invention to provide a method by means of which it is possible to carry out the selective elimination of failed fibers after potting in a bundle. The term "failed fibers" means hollow fibers that are broken, pinholed, injured, etc. Common to all these defects is the existence of a free passage between the feed and permeate sides, through which non-selective flow is enabled.

It is another object of the invention to provide a simple and inexpensive method by means of which it is possible to use membrane modules which have lost their selectivity due to mechanical failure.

It is a further object of the invention to provide a method through which it is possible to manufacture hollow fiber bundles at an industrially acceptable production rate, and which avoids the need for manual inspection and correction of mechanical failures.

It is still another object of the invention to provide a method through which it is possible to discriminate failed fibers from good fibers, as a tool for the selective elimination of the former without removing them individually from the whole bundle.

The method of selectively clogging failed hollow fibers of a membrane module according to the invention, wherein the said fibers are packed together with a plurality of non-failed fibers in an arrangement that enables separate accesses to the shell and bore sides of the hollow fibers, comprises the steps of:

(i) Holding the module vertically and bringing the module end into contact with a liquid sealant;

(ii) Causing the liquid sealant to rise into the failed fibers to a height greater than that of the failure;

(iii) Allowing the sealant to solidify at least partially;

(iv) Cutting off a length of the fiber bundle of such height that non-failed fibers bores are exposed while failed fibers remain clogged.

According to a preferred embodiment of the invention, the said method comprises the steps of:

1. Clogging all fiber bores at one end of the pack or bundle of fibers;

2. Substantially evacuating the module both at the shell and at the bore side;

3. Filling the bore and the shell sides with a non-permeant fluid;

4. Holding the module vertically, disconnecting the bore side of the module from the non-permeable fluid supply and dipping the module end opposite the clogged end into a reservoir containing a liquid sealant;

5. Applying a reduced pressure to the shell side for a period of time sufficient to permit suction of sealant into the bores of failed fibers through the failure of which vacuum is applied to the bore side;

6. Allowing the sealant to solidify at least partially;

7. Cutting off a length of the fiber bundle such that non-failed fibers bores are exposed while failed fibers remain clogged;

8. If necessary, repeating the above steps at the other end of the module.

As used herein the term "vacuum" is meant to signify a reduced pressure, and includes a partial or a full vacuum, as the case may be.

It is worth noting that in stage 5 above, the sealant penetration into the failed fibers is much deeper than that into the perfect fibers which received no vacuum into their bores. Furthermore, stage 8 will normally be performed if the module is to have access to both hollow fiber ends of the bore sides.

According to another preferred embodiment of the invention, the method comprises the steps of:

I. Clogging all fiber bores at one end of the pack or bundle of fibers;

II. Substantially evacuating the module both at the shell and at the bore side;

III. Filling the bore and the shell sides with a non-permeant fluid;

IV. Holding the module vertically, disconnecting the bore side of the module from the non-permeable fluid supply and dipping the module end opposite the clogged end into a reservoir containing a liquid sealant;

V. Applying a reduced pressure to the shell side for a period of time sufficient to permit suction of sealant into the bores of failed fibers through the failure of which vacuum is applied to the bore side;

VI. Optionally, allowing the sealant partially to solidify;

VII. Filling the shell side with a permeant fluid, whereby to cause the permeant fluid permeating to the bore side to expel the sealant from non-failed fibers;

VIII. Cutting off a length of the fiber bundle such that non-failed fibers bores are exposed while failed fibers remain dogged;

IX. If necessary repeating the above steps at the other end of the module.

BRIEF DESCRIPTION OF THE INVENTION

The property used for the selective elimination which discriminates between failed fibers and good fibers is non-selective fluid transport between bore and shell sides of the failed fibers.

The selective elimination consists of introducing an adhesive (sealant) into the bores of the failed hollow fibers that hardens therein, thus clogging them and preventing the non-selective transport through them.

DETAILED DESCRIPTION OF PREFERRED EMBODIMENTS

The method according to one preferred embodiment of the invention is illustrated in FIGS. 1 to 6.

Normal Potting Procedure

Figure 2:
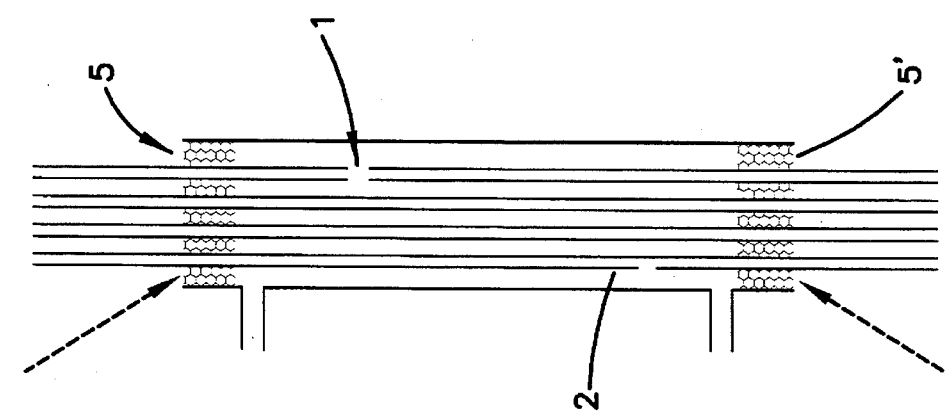
Figure 1:
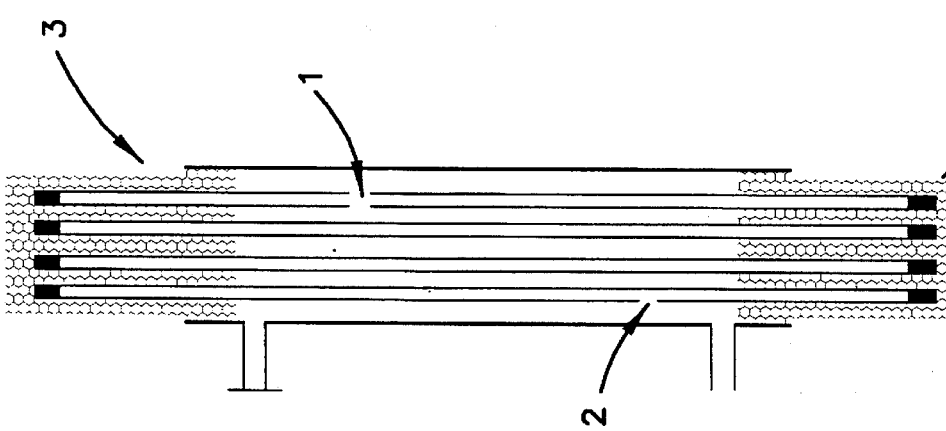

In FIGS. 1 and 2, two typical methods of the potting process are shown. In FIG. 1, potting is made by dipping the membrane module into the liquid sealant, thus clogging the bore ends. In FIG. 2, potting is made by applying the liquid, viscous sealant sideways at the module tube end while the HF bundle is extending out, thus leaving the HF ends open. For initiating the SCFF, the HF bundle must be brought to the position of FIG. 3A, namely, one end of the HF bundle should be open and the other end closed (FIG. 3B). In all Figures, only four hollow fibers are shown, for the sake of simplicity, which represent a bundle of a much greater number of fibers. In this figure and in some of the following figures as well, one hollow fiber is shown as broken, as indicated by numeral 1, and another is pinholed, as indicated by numeral 2, so that they generally represent failed fibers.

The module ends are potted by dipping the module in a liquid adhesive, generally indicated at 3 and 3'. The adhesive is cured by any known technique, such as by the lapse of time, or by other means such as contact catalysis or thermal setting. By this dipping method, the adhesive will most likely penetrate into all the hollow fiber (HF) bores to a certain depth (a few ram) and clog them. The fibers can then be opened by cutting the clogged portion, as shown at 4 in FIG. 3A, which if it had no failed fibers, demonstrates a basic HF membrane module ready for assembly in a separation system.

In a slightly different method, potting is made by applying the adhesive to the side of the bundle near the tube end (FIG. 2), thus creating a thinner layer of adhesive 5 and 5', rather than by dipping the whole module end, as in FIG. 1 (rotation of the whole module about its axis is often applied, until adhesive is cured, in order to spread the adhesive across the tube). By the procedure illustrated in FIG. 2 the bore ends of the HF are left open.

EXAMPLE 1

Vacuum Only Treatment for Selective Clogging of Failed Fibers

In order to be able to operate according to the invention, a "taft" of certain length of the hollow fiber bundle must be provided at the extremities of the module, protruding out from the module tube, as is shown in FIGS. 1 to 5.

It is essential that the HFs' bores at the other (non-treated) end are individually clogged. This implies that if the basic potting method was side adhesive application (FIG. 2), then the bore ends at the non-treated side should all be sealed off as is shown at 6 in FIG. 3B. Conversely, if both ends were sealed, it is possible to open-up one end by cutting off the sealed end, since, as stated, an extra length of the fiber is left at the extremities.

Figure 3A:
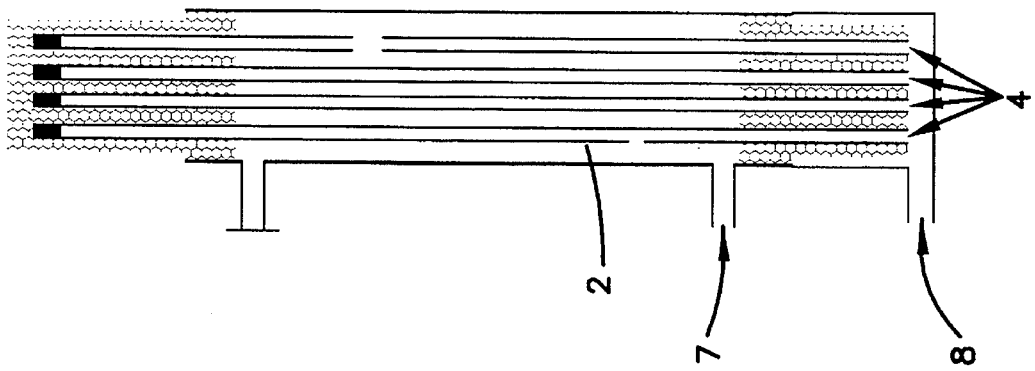
FIGS. 1 through 5 illustrate various steps of the SCFF procedure.
Figure 3B:
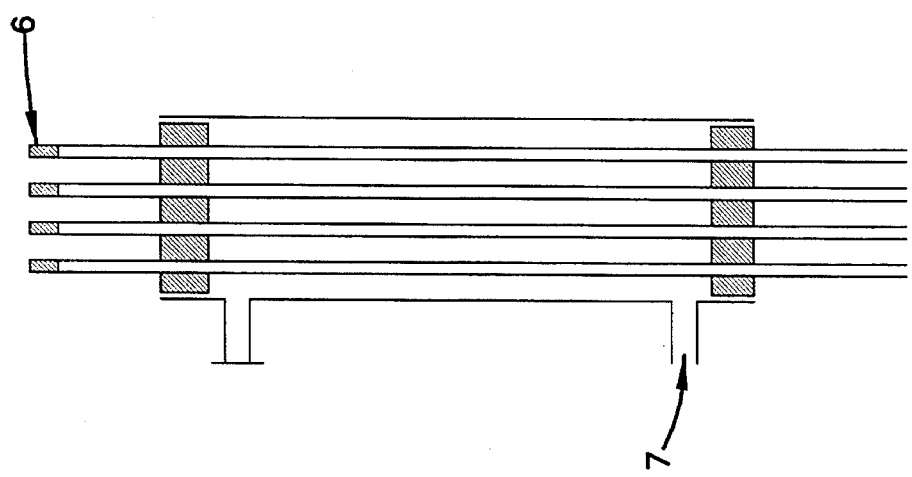

After the above-detailed situation has been obtained, the shell side 7 and the bore side 8 of the module are connected to a vacuum line to remove any existing fluid (FIG. 3A). A non-permeant is then introduced into the bore and shell sides, up to ambient pressure. By "non-permeant" is meant to indicate a fluid that does not penetrate defect-free membrane walls.

Figure 4:
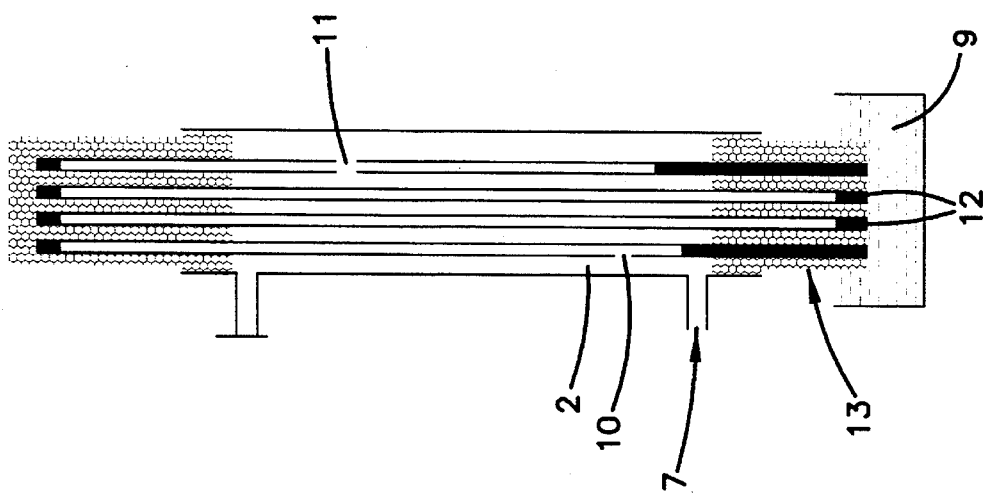

The module is held vertically. The bore side is disconnected from the non-permeable fluid supply, and immediately dipped into a liquid sealant 9, as shown in FIG. 4. The shell side 7 is then connected to a suction line which reduces the pressure at this side to a value Dp below that of the bore side (the bore side being at ambient pressure), for a preset time t, after which suction is released by introducing the non-permeant at the shell side. The preset time t is selected such that together with the bore diameter, the extent of vacuum (if partial), the sealant viscosity and its increase with time (the curing process), will lead to the desired penetration depth into the failed fibers. During the suction time, the sealant penetrates only into the bores of the failed fibers, since the pressure difference Dp is transmitted through the leak of the failed fiber from the shell to the bore side. This is illustrated by the raise of the sealant in the two failed fibers of FIG. 4, indicated by numerals 10 and 11.

Nominally, no sealant penetration is possible into the non-failed HFs, since the non-permeant filling them cannot be pumped out through the membrane walls. In practice, some penetration will take place into the non-failed fibers by capillary action due to mere contact with the sealant, but to a much lesser depth, as is shown by 12 in FIG. 4. The height of sealant penetration into the defective fiber bores is determined by controllable parameters, such as the preset suction (evacuation) time, the pressure differential Dp and the sealant viscosity.

After the seal is set within the HF bores, the bundle tail is cut at about point 13 (FIG. 4), to a length that removes the shallow seals formed at the ends of the non-failed fibers, but not the deeper seals that were formed along the defects of the fibers.

Figure 5:
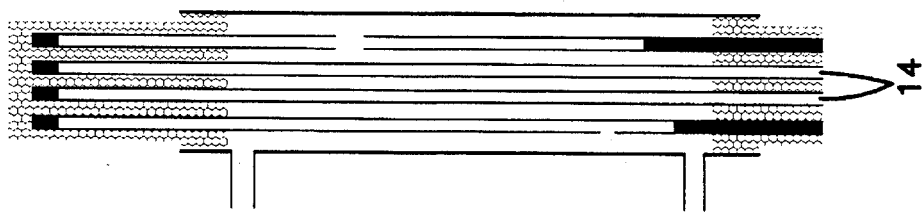

The resulting bundle shown in FIG. 5 has now selectively clogged failed fibers, as can be seen by comparison with the non-treated bundle of FIG. 3A.

If the finished module is of the type having a dead end at one of the bore sides, then the treatment terminating after the step shown in FIG. 5 is sufficient. However, if two bore side opening are desired, the tail-cutting step must be postponed. The module is turned upside down, the second module end is introduced into the sealant bath, suction is created to clog the other end of the failed fibers already clogged on the opposite end, and finally, the two tails are cut as described above.

EXAMPLE 2

Vacuum-Pressure Treatment for Selective Clogging of Failed Fibers

An important alternative to the suction release by the introduction of a non-penetrant, as described above, and the subsequent tail-cutting step, is the introduction of a penetrant at the shell side to release suction. Under such circumstances, the penetrant diffuses to the bore side, and increases the pressure therein above ambient pressure. In the non-failed fibers, this pressure increase pushes out the sealant from the fiber end, while in the case of failed fibers, the diffusing penetrant flows back to the shell side through the defect (pinhole or fracture), and thus it cannot apply a pressure within the fiber. By selecting the right timing of suction release by a penetrant so that the sealant has thickened to the right extent, the process can be adjusted so as to open up the shallow seals from the non-failed fibers only but not from the failed fibers.

This embodiment of the invention is particularly important in the repairing of operative modules which have no "tail" ends, as specified in Example 1, since the back diffusion of permeate does not call for tail cutting. This also greatly simplifies the membrane module design, since no provisions have to be made for the tail element and tail cutting. The situation obtained through this method is illustrated in FIG. 5, where the two non-failed ends 14 have been cleared of sealant by bore overpressure, formed by introducing a penetrant at the shell side.

Choice of Sealant

The sealant serving for the purpose of selective clogging of failed fibers (SCFF) should preferably be of the non-shrinking type. Therefore, sealants which solidify by solvent evaporation are less suitable. The preferred materials are therefore those that set catalytically or thermally or in both ways, such as epoxy, acrylics, silicones, phenol-formaldehydes, furfuryl alcohol and the like. In terms of viscosity, which is a crucial parameter, determining the depth of sealant penetration into failed fibers, these materials may be divided into high and low viscosity groups.

To the first group belong partially polymerzed adhesives having honey-like consistency, such as the epoxies and some silicones. The viscosities of sealants belonging to this group range between a few hundreds and a few ten-thousands of centipoise units. To the second group belong monomeric liquids having viscosities in the range of 0.3–3 centipoise units, such as phenol-formaldehyde and furfuryl alcohol.

Recognizing that there are intermediate cases between these two groups, there is a span of 3 to 4 orders of magnitude in the viscosities of the two groups. Accordingly, two general methods of applying the sealant to the SCFF treatment process must be used, depending on whether the sealant has a high or a low viscosity.

It should further be noted that the invention is not limited to the use with any particular type of fiber, and can be employed, e.g., with carbon membranes just as with glass, ceramic or polymer membranes. The skilled person will be able to take into account construction material considerations, when choosing the most appropriate sealant for SCFF with a given membrane.

Process Parameter Analysis and Control

In this section a brief quantitative analysis of the SCFF parameters will be given. This analysis is provided for a better understanding of the different variations in procedures, which are claimed herein.

The most important parameter which has to be controlled is the depth of penetration of the sealant into the failed fibers. A shallow penetration will make it hard to define the crucial location of tail cutting (this has to be located beyond the depth of the sealant penetration into the perfect fibers, and below that of the failed fibers). On the other hand, too deep a penetration cannot be allowed:

1. If the defect in the membrane is close to the SCFF treated module end. In this case the penetrating sealant may emerge from the defect to the shell side of the module, cement many fibers together and disturb the module functionality in various ways.
2. If heat treatment is to be applied later to the module, since the sealant compound, which is typically an organic polymer, may be pyrolyzed, and the outcoming fumes may cause the clogged fiber to burst and severely to contaminate the entire membrane module. Such a sequence of events might be relevant with thermally stable membranes such as carbon, ceramic and polyphosphazene-based membranes. Such membranes may have to be heat-treated to remove impurities which reduce permeation, or may be operated at high temperature separation processes.

Figure 10:
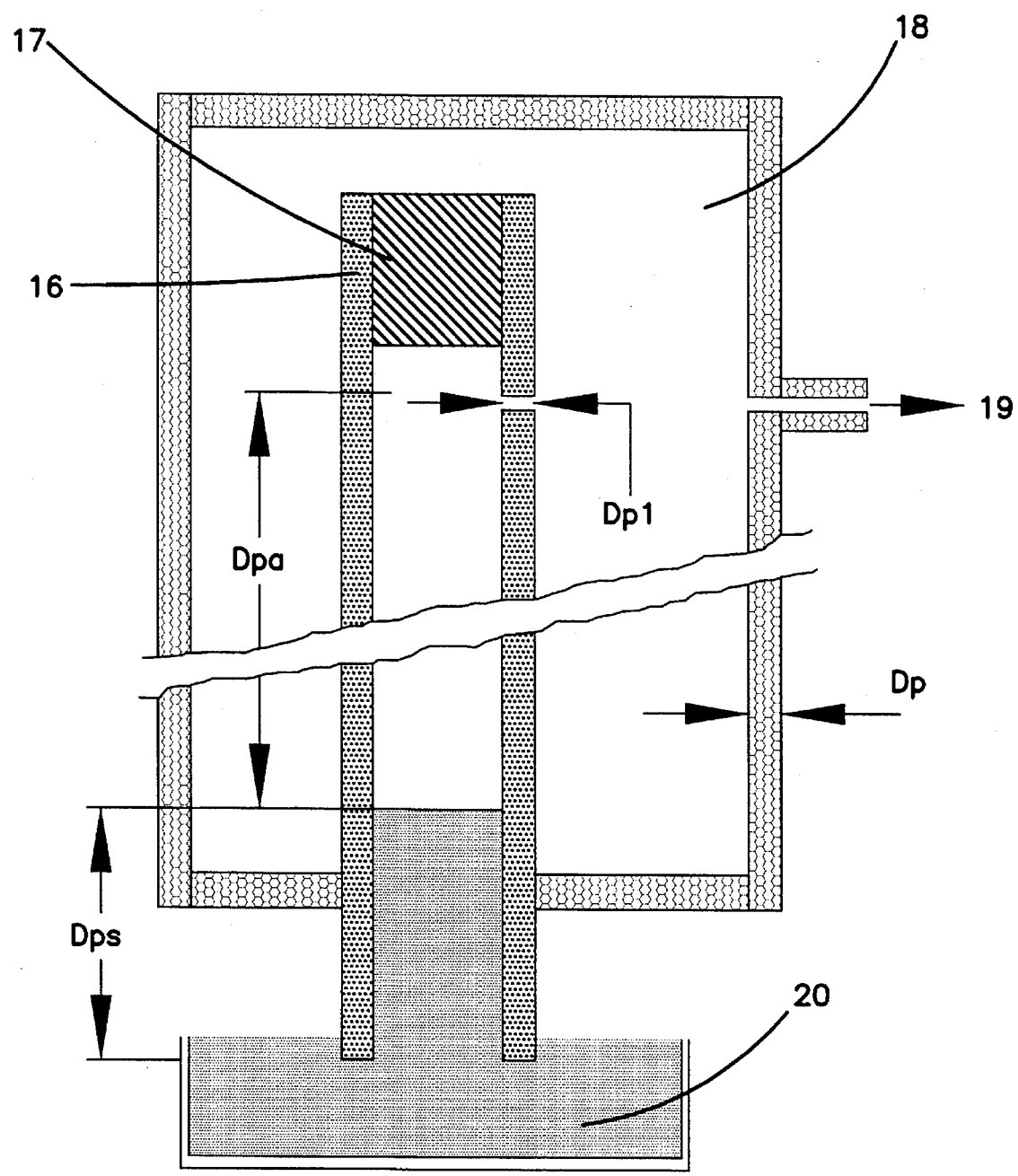
FIG. 10 illustrates the pressure chops in the course of SCFF.

The factors which determine the sealant penetration depth (PD) stem from laminar viscous flow considerations which govern the flow rate of the sealant into the fiber's bore. These factors are:

1. The pressure difference Dp between bore and shell sides that is created during the suction of the sealant into the failed fibers' bores. This pressure difference provides the diving force for the sealant penetration into the failed fibers.
2. The suction duration.
3. The liquid sealant viscosity. Obviously, the lower the viscosity, the greater is the depth of penetration, everything else being equal.
4. The leak size at the defect points of the failed fibers, as shown in FIG. 10.

In the course of SCFF, the externally applied pressure difference Dp is divided into three components: Dp1, which falls on the leak at the defect point; the axial pressure drop Dpa which results from the non-penetrant viscous flow along the distance 1 between the leak and the surface of penetrating sealant, and Dps, which drives the sealant penetration. In FIG. 10, numeral 16 indicates the hollow fiber, numeral 17 the dead end of the fiber, numeral 18 is the shell compartment, 19 is the suction line and 20 is the sealant well.

We may therefore write:

$$Dp=Dp1+Dpa+Dps \quad (1)$$

5. The distance 1 which determines the magnitude of axial pressure drop Dpa, as described above. If the non-penetrant's viscosity is by far less than that of the sealant, this pressure drop may be neglected. This situation is possible when the non-penetrant is a gas which is at least 3 orders of magnitudes less viscous than the liquids (the sealers). In another case, the liquid sealant may be a highly viscous (more than 2000 centipoise) such as epoxy resins, while the non-permeant may be a common liquid of viscosity 0.3–3 centipoise.

With regards to these arguments, we will assume in the following that factor no. 5, namely the axial pressure drop, can be neglected.

The basic equation of sealant flow into the hollow fiber (HF) obeys the Poisueille equation:

$$F=pDps \ r^4/(8 \times h)+tm \quad (2)$$

where F is the sealant flow rate in $cm^3$/sec into the HF, r is the inner HF radius in cm, assuming that its cross-section is circular; x is the depth of penetration of the sealant at any moment; and e is the viscosity in dyne-sec/$cm^2$ (poise).

The average axial liquid velocity dx/dt is obtained by dividing F by the tube cross-section $\pi r^2$ and rearranging. Thus:

$$dx/dt=r^2 Dp/(8h)x \quad (3)$$

In the following, the description of the treatment will be split into 3 methods, two for the high viscosity and the third for the low viscosity sealants.

(a) High viscosity, slow setting sealant

Based on eqns. (2)–(3), it can be readily shown that:

$$x=[2r^2 Dpt/(8h)]^{1/2} \quad (4)$$

from which we find that, for instance, for a penetration depth (PD) of 5 cm, a high viscosity sealant of, say, 3000 centipoise (group 1), an inner HF radius of 100 microns (0.01 cm), and Dp 1 bar (10 6 dyne/$cm^2$ in cgs units), the penetration time will be, according to equation 4c, $5^2 \times 8 \times 30/(2 \times 10^{-4} \times 10^6)$=30 seconds. This penetration time falls within a range of the reasonably practical. Shorter times would be harder to control, while longer ones will cause catalytically set adhesives (epoxy) to become too viscous to advance to the desired depth into the fiber bores.

Accordingly, in one embodiment of the invention a high viscosity, slow setting sealant is applied to failed hollow fibers having an inner diameter of at least 10 μ, for a period of time of at least 0.1 minute, under a pressure difference Dp of at least 3 cm of water, until a penetration depth of at least 5 mm is achieved.

b. High viscosity, fast-setting sealant.

One may take advantage of using fist-setting adhesives to obtain the desired range of penetration depth independent of the application time of the driving force Dp. Explicitly, using the proper pressure drop and a given viscosity range of a freshly prepared, fast-setting adhesive, it is possible to apply the pressure drop for an excessively long time until the adhesive flow along the membrane bore ceases due to adhesive setting. This is a great simplification of the process.

Thus, in another preferred embodiment of the invention a high viscosity, fast setting sealant is applied to failed hollow fibers having an inner diameter of at least 10 μ, under a pressure difference Dp of at least 0.01 bar, for a period of time such that the desired penetration depth of at least 5 mm is achieved.

c. Low viscosity sealants.

According to eqn. (4) low viscosity sealants will penetrate too deeply within a reasonable time of a few seconds under a pressure difference of one bar. Thus, for a viscosity of 1 centipoise, penetration time of 30 seconds and PD of 5 cm, the driving pressure Dp according to equation 4, should be no more than a few cm of water. This magnitude is comparable to the capillary rise and gravitational head values for a vertically positioned HF bundle. Thus, the capillary rise can, in the case of low viscosity sealants, furnish the driving pressure difference Dp for the SCFF, leading to a simpler process which saves externally applied vacuum.

The more important advantage of this method over the forced high (1 bar or the like) Dp is that it sets an asymptotic limit to the PD if the HF bundle is held vertically.

As will be apparent to a person skilled in the art, the limiting capillary rise$\times$(=PD) will just balance the capillary force, namely:

$$gdx=Dp=2g\cos\alpha/r \quad (5)$$

where g is the gravitational acceleration (981 dyne-sec$^{-2}$) and d is the sealant density (gram—cm$^{-3}$).

From this equation, it can be estimated that for the set of typical data r=100 microns, surface tension 30 dyne/cm, as is typical to many organic liquids, a contact angle $\alpha$=0, and density 1 gm/cm$^3$ for the sealant, the PD is about 6 cm.

For this mode of applying SCFF, knowing the time constant T of sealant penetration is of practical importance. Analysis of eqn. (5) shows that:

$$T=12.8hg/(r^3d^2g^2) \quad (6)$$

which shows that in difference to the forced driving pressure (equation 4c) method, in the capillary force-driving pressure method, the penetration time is inversely proportional to the third power of the HF bore radius. For r=100 microns, h=1 centipoise and g=30 dyne/cm, as is typical to many organic liquids, we obtain a realistic value for T:

$$T=12.8\times0.01\times30/(0.01^3/1/1000^2)=3.8 \text{ sec.}$$

Thus, according to another preferred embodiment of the invention, a low viscosity sealant is applied to failed hollow fibers having an inner diameter of at least 50 μ, without forcing a pressure difference, for a period of time such that the desired penetration depth, ranging from 0.5 to 3 cm, is achieved by capillary rise.

EXAMLPE 3

AUTO SCFF

Figure 7:
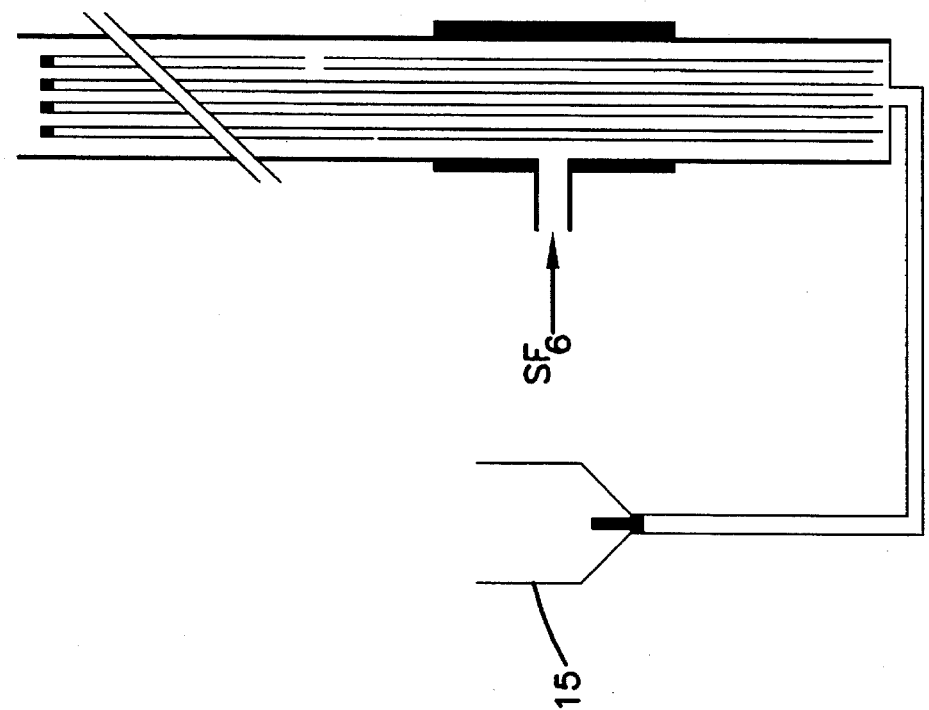
FIGS. 6 through 9 illustrate the auto-SCFF procedure.
Figure 6:
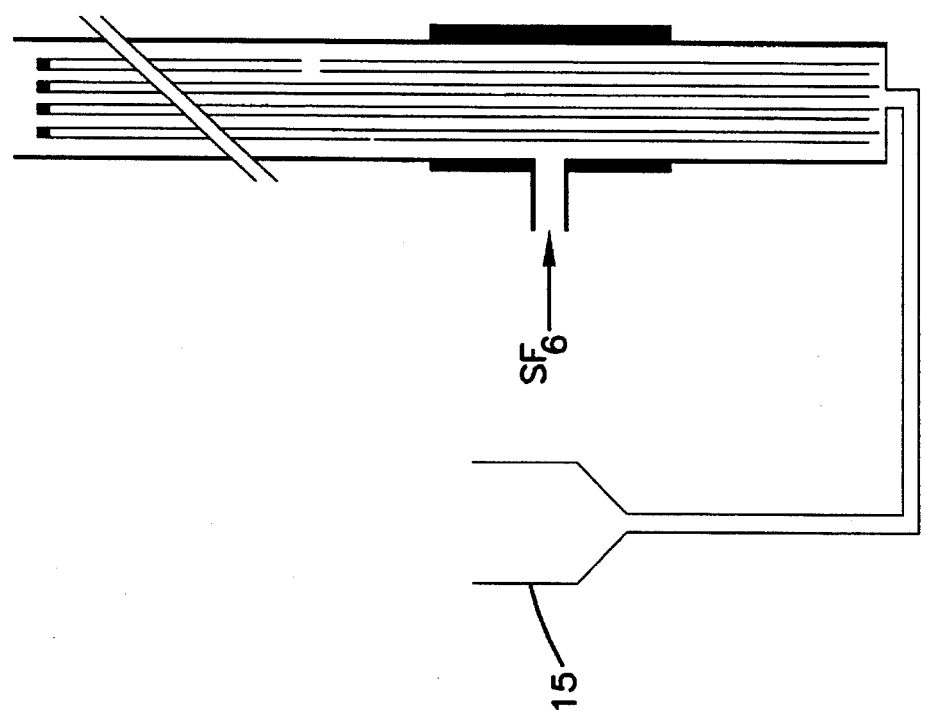

Automatic SCFF is an SCFF operation effected integrally during the process of potting. The main difference between it and regular potting is by pre-exposing the module to a non-permeant for a sufficiently long period, so that the bore and feed sides are filled with it, as shown in FIGS. 6 and 7. In FIG. 6 a carbon membrane is seen. As the non-penetrant SF$_6$ (sulfur hexafluoxide) has been chosen, which flows from the tee connection downwards, so that the bottom side of the module is filled with it (SF$_6$ is much heavier than air so that it tends to settle down). In FIG. 7, the bottom connection of the sealant container 15, which was left open in the first stage (FIG. 6) is shut, and SF$_6$ flows upward the module to fill its upper parts.

Figure 9:
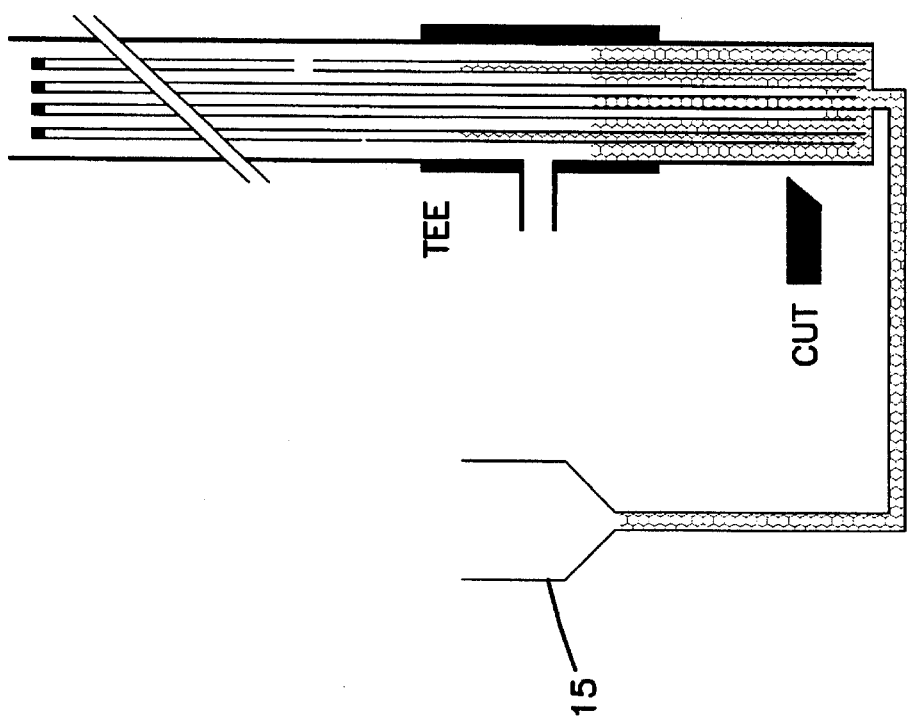
Figure 8:
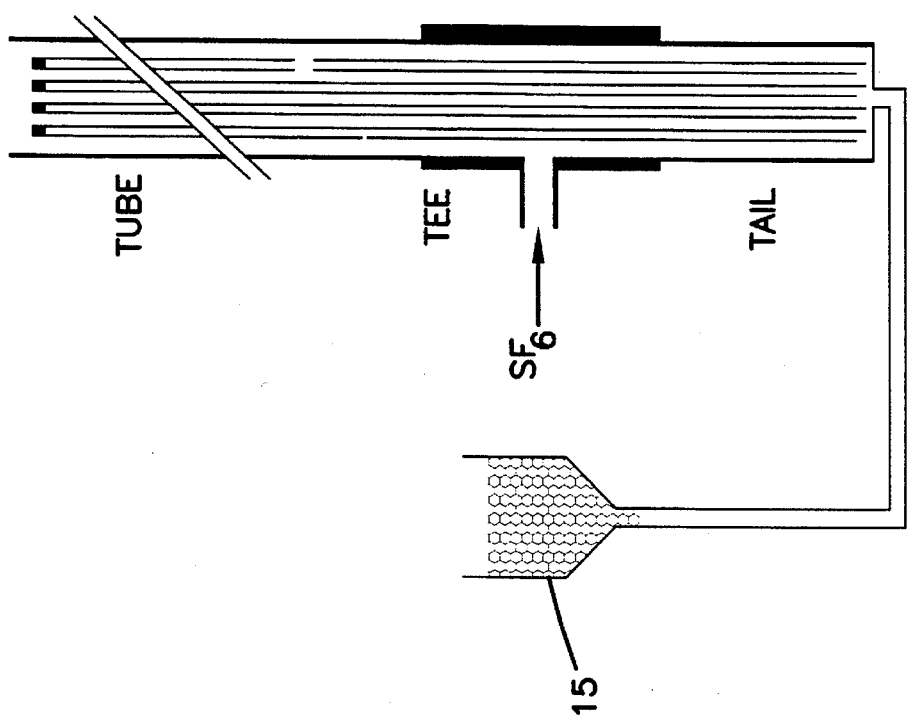

In FIG. 8 the bung is removed from the container 15 and the sealant is poured into it. In FIG. 9, it is shown that the sealant container is positioned so that if the right amount of sealant is cast, it will fill the bottom shell side of the module up to the desired height due to the siphon effect and gravity. The filling level into the pores, proceeds up high into the failed fibers (higher than in the shell side, due to capillarity) since it can reject the non-permeant out to the shell side through the fracture/pinhole opening. The penetration depth into the non-failed fibers proceeds only partially.

After curing, the module tail is cut at the fight depth according to the regular procedure. As in the previously mentioned SCFF modes, the treatment is repeated at the other end of the module if two bore feed connections are desired.

As will be appreciated by the skilled person, the method of the invention can be used to correct a variety of defects, and is not limited to specific materials, sealants and bundle shapes. Many modifications can be effected in the methods employed, without exceeding the scope of the invention.

We claim:

1. A method of selective clogging of failed hollow fibers of a membrane module comprising a pack or bundle of fibers in a shell-side and bore-side arrangement, the pack or bundle comprising failed fibers together with a plurality of non-failed fibers, the method comprising the steps of:

clogging bores of all of the fibers at one end of the pack or bundle of the fibers;

substantially evacuating the membrane module both at the shell-side and at the bore-side;

filling the bore-side and the shell-side side with a non-permeant gas;

subsequently holding the membrane module vertically, disconnecting the bore-side of the membrane module from a supply of the non-permeant gas and dipping another end of the membrane module opposite to the clogged end into a reservoir containing a liquid sealant;

applying a reduced pressure to the shell-side for a period of time sufficient to permit suction of the liquid sealant into the bores of the failed fibers through a failure of which vacuum is applied to the bore-side;

allowing the sealant to solidify at least partially to clog the bores of both the failed fibers and the non-failed fibers; and cutting off a length of the pack or bundle of the fibers such that the bores of the non-failed fibers are exposed while the bores of the failed fibers remain clogged with the sealant.

2. A method of selective clogging of failed hollow fibers of a membrane module comprising a pack or bundle of fibers in a shell-side and bore-side arrangement, the pack or bundle comprising failed fibers together with a plurality of non-failed fibers, the method comprising the steps of:

clogging bores of all of the fibers at one end of the pack or bundle of the fibers;

substantially evacuating the membrane module both at the shell-side and at the bore-side;

filling the bore-side and the shell side with a non-permeant gas;

subsequently holding the membrane module vertically, disconnecting the bore-side of the membrane module from a supply of the non-permeant gas and dipping another end of the membrane module opposite to the clogged end into a reservoir containing a liquid sealant;

applying a reduced pressure to the shell-side for a period of time sufficient to permit suction of the liquid sealant into the bores of the failed fibers through a failure of which vacuum is applied to the bore-side;

optionally, allowing the sealant to thicken, but not to solidify;

filling the shell-side with a permeant gas, whereby to cause the permeant gas permeating to the bore-side to expel the sealant from the non-failed fibers, thus opening up the bores of the non-failed fibers; and allowing the sealant to solidify to clog the bores of the failed fibers.

3. A method according to claim 2, wherein the liquid sealant being a high viscosity, slow setting sealant is applied to the failed fibers having an inner diameter of at least 10 μ, for the period of time of at least 0.1 minute, under a pressure difference Dp of at least 3 cm of water, until a penetration depth of at least 5 mm is achieved.

4. A method according to claim 2, wherein the liquid sealant being a high viscosity, fast setting sealant is applied to the failed fibers having an inner diameter of at least 10 μ, for the period of time of at least 0.1 minute, under a pressure difference Dp of at least 3 cm of water, until a penetration depth of at least 5 mm is achieved.

5. A method according to claim 1, wherein the liquid sealant being a low viscosity sealant is applied to the failed fibers having an inner diameter of at least 20μ, without forcing a pressure difference, for the period of time such that a desired penetration depth, ranging from 0.5 to 10 cm, is achieved by capillary rise.

6. A method according to claim 1, wherein the liquid sealant is permitted to fill a bottom portion of the membrane module and to rise by virtue of capillarity, thereby expelling the non-permeant gas from the failed fibers and rising higher therein than in non-failed, non-permeant gas filled fibers.

7. A method according to claim 6, wherein the non-permeant gas is sulfur hexafluoride.

8. A method according to claim 1, further comprising a step of potting by dipping the membrane module into a liquid adhesive.

9. A method according to claim 1, further comprising the same steps repeated for the other end of the membrane module.

10. A method according to claim 2, further comprising the same steps repeated for the other end of the membrane module.

* * * * *

UNITED STATES PATENT AND TRADEMARK OFFICE
CERTIFICATE OF CORRECTION

PATENT NO. : 5,575,963
DATED : November 19, 1996
INVENTOR(S) : Soffer et al

It is certified that error appears in the above-identified patent and that said Letters Patent is hereby corrected as shown below:

On the title page: Item [73] Assignee:

Assignee: insert --and-- after the word "Israel"

Col. 4, line 26: "chops" should read --drops--

Col. 5, line 10: "taft" should read --tail--

Col. 6, line 50: "polymerzed" should read --polymerized--

Col. 7, line 52: "1" should read --1-- (bold print)

Col. 8, line 11: delete "+tm" after the letters "(8xh)"

UNITED STATES PATENT AND TRADEMARK OFFICE
CERTIFICATE OF CORRECTION

PATENT NO. : 5,575,963
DATED : November 19, 1996
INVENTOR(S) : Soffer et al

It is certified that error appears in the above-identified patent and that said Letters Patent is hereby corrected as shown below:

Col. 8, line 47: "fist-setting" should read --fast-setting--

Col. 9, line 52: "hexafiuoxide" should read --hexafluoride--

Col. 10, line 3: "fight" should read --right--

Col. 10, line 24, Claim 1: delete "side" after the word "shell-side"

Signed and Sealed this

Ninth Day of December, 1997

Attest:

Attesting Officer

BRUCE LEHMAN

Commissioner of Patents and Trademarks